United States Patent [19]
Kadowaki et al.

[11] Patent Number: 5,737,116
[45] Date of Patent: Apr. 7, 1998

[54] FREQUENCY SHIFTER AND OPTICAL DISPLACEMENT MEASURING APPARATUS USING THE SAME

[75] Inventors: Hidejiro Kadowaki, Yokohama; Makoto Takamiya, Tokyo; Shigeki Kato, Utsunomiya, all of Japan

[73] Assignee: Canon Kabushiki Kaisha, Tokyo, Japan

[21] Appl. No.: 640,111

[22] Filed: Apr. 30, 1996

[30] Foreign Application Priority Data

May 12, 1995 [JP] Japan ............................. 7-114566

[51] Int. Cl.$^6$ .................................................. G02F 1/35
[52] U.S. Cl. ............................................................ 359/359
[58] Field of Search .................................. 359/326–332

[56] References Cited

U.S. PATENT DOCUMENTS 5,256,885 10/1993 Takamiya et al. ...................... 250/561
5,312,565 5/1994 Beckerbauer et al. ............. 359/328 X
5,317,666 5/1994 Agostinelli et al. ................ 359/328 X
5,481,636 1/1996 Fukuda et al. ..................... 359/332 X
5,483,332 1/1996 Takamiya et al. .................... 356/28.5
5,502,466 3/1996 Kato et al. .............................. 356/356
5,515,199 5/1996 Farina ................................... 359/326

FOREIGN PATENT DOCUMENTS

4-230885  8/1992  Japan.

*Primary Examiner*—John D. Lee
*Attorney, Agent, or Firm*—Fitzpatrick, Cella, Harper & Scinto

[57] ABSTRACT

A frequency shifter is capable of controlling the adverse influences of electric noise caused by the voltage applied to electrooptical elements of a frequency shifter. The frequency shifter modulates the phase of the luminous flux entering the electrooptical elements by applying a voltage to the electrooptical elements; the shifter is provided with a shield for electrically shielding the circuit for generating the voltage to be applied to the electrooptical elements and the electrooptical elements from an external circuit.

11 Claims, 9 Drawing Sheets

FREQUENCY SHIFTER AND OPTICAL DISPLACEMENT MEASURING APPARATUS USING THE SAME

BACKGROUND OF THE INVENTION

1. Field of the Invention

The present invention relates to a frequency shifter and an optical displacement measuring apparatus using the same. The present invention is ideally used for performing non-contact measurement of the displacement of a moving object or fluid (hereinafter referred to as "moving body") in particular, by detecting the shift of the frequency of the scattered light which has been subjected to a Doppler shift according to the moving speed of the moving body.

2. Description of the Related Art

Hitherto, a method for modulating a signal by means of an optical frequency shifter is often used for various types of interferometers.

A laser Doppler velocimeter is known as one of the interferometers which are capable of measuring the displacement of an object with high accuracy without the need of contact.

The laser Doppler velocimeter is a device which is designed to measure the moving velocity of a moving body by radiating a laser beam to the moving body and making use of the Doppler effect in which the frequency of the scattered light shifts in proportion to the moving velocity.

Figure 1:
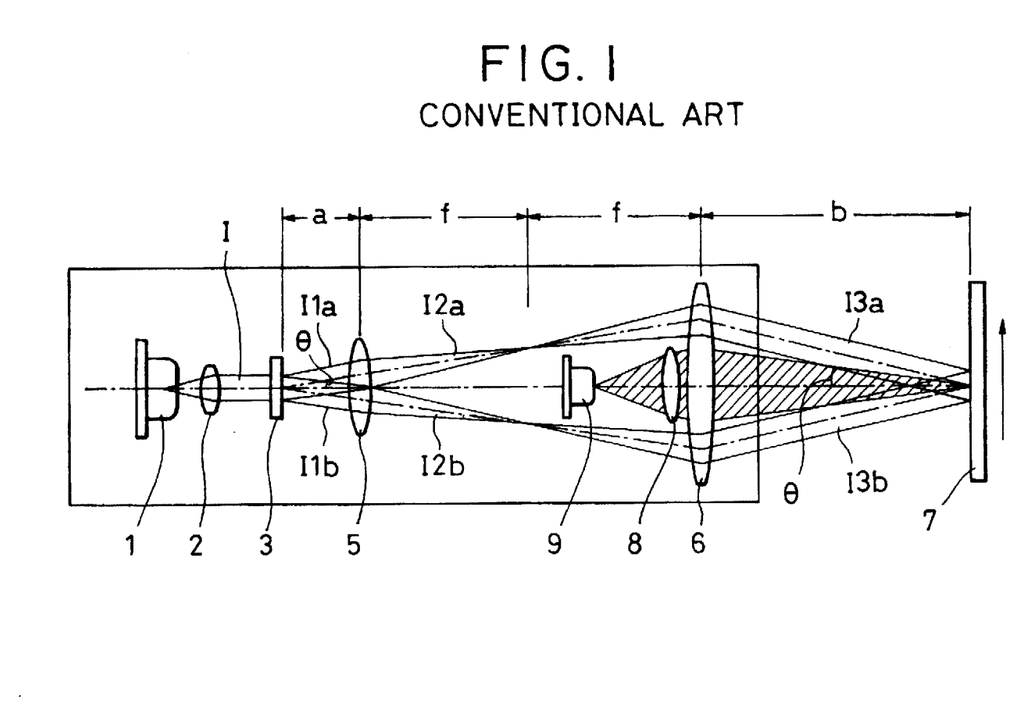
FIG. 1 illustrates a conventional laser Doppler velocimeter.

FIG. 1 shows an example of a conventional laser Doppler velocimeter which has been disclosed in Japanese Patent Laid-Open No. 4-230885 and U.S. Pat. No. 5,256,885.

The laser Doppler velocimeter shown in FIG. 1 includes a laser 1, a collimater lens 2 for producing a parallel luminous flux I, a beam splitter 3 including a diffraction grating, convex lenses 5 and 6 having a focal distance f, wherein a+b=2f, "a" being the distance between the beam splitter 3 and convex lens 5, and "b" being the distance between an object 7 and convex lens 6, a condensing lens 8, and an optical sensor 9. The object 7, shown in FIG. 1, is moving in the direction indicated by the arrow shown at velocity V to be measured.

The laser beam emitted from the laser 1 is transformed into the parallel luminous flux I through the collimator lens 2. Parallel luminous flux I then enters the diffraction grating 3 and is then separated into diffracted lights I1a and I1b of plus/minus primary diffraction angle θ for emission. The luminous fluxes I1a and I1b are then turned into converged beams I2a and I2b through the convex lens 5 having the focal distance f. When the converged beams I2a and I2b pass through the convex lens 6 at a distance 2f from convex lens 5, they again become parallel luminous flux beams, identified as I3a and I3b, so that two luminous fluxes I3a and I3b are radiated to the object 7, at an incident angle θ which is identical to diffraction angle θ given by the diffraction grating 3. The scattered lights resulting from the radiation of the two luminous fluxes are detected by the optical sensor 9 via the condensing lens 8. The frequencies of the scattered lights from the two fluxes are subjected to Doppler shifts of +Δf and −Δf, respectively, in proportion to moving velocity V. If the wavelength of the laser beam is taken as λ, then Δf can be represented by expression (1):

$$\Delta f = V \cdot \sin(\theta)/\lambda \tag{1}$$

The scattered lights which have been subjected to the Doppler shifts of +Δf and −Δf interfere with each other, causing a change in the brightness on the light receiving surface of the optical sensor 9. Frequency F in this case is given by expression (2) shown below:

$$F = 2 \cdot \Delta f = 2 \cdot V \cdot \sin(\theta)/\lambda \tag{2}$$

From expression (2), velocity V of the object 7 to be measured can be obtained by measuring frequency F (hereinafter referred to as "Doppler frequency") of the optical sensor 9.

Further, based on a conditional formula of the diffraction by diffraction grating 3: sin (θ)=λ/d (where d is the grating interval of the diffraction grating 3), expression (3) given below can be derived:

$$F = 2 \cdot V/d \tag{3}$$

Thus, the Doppler frequencies no longer depend on laser wavelength λ. This means that the angle of diffraction and incident angle θ change to compensate for the change in laser wavelength λ.

A method has been devised for such a laser Doppler velocimeter so that it employs a frequency shifter to add a predetermined frequency fR as a bias to the Doppler frequencies in order to permit easy detection of the moving direction of a moving body and also to permit accurate detection even when the velocity of the moving body is nearly zero.

Figure 2:
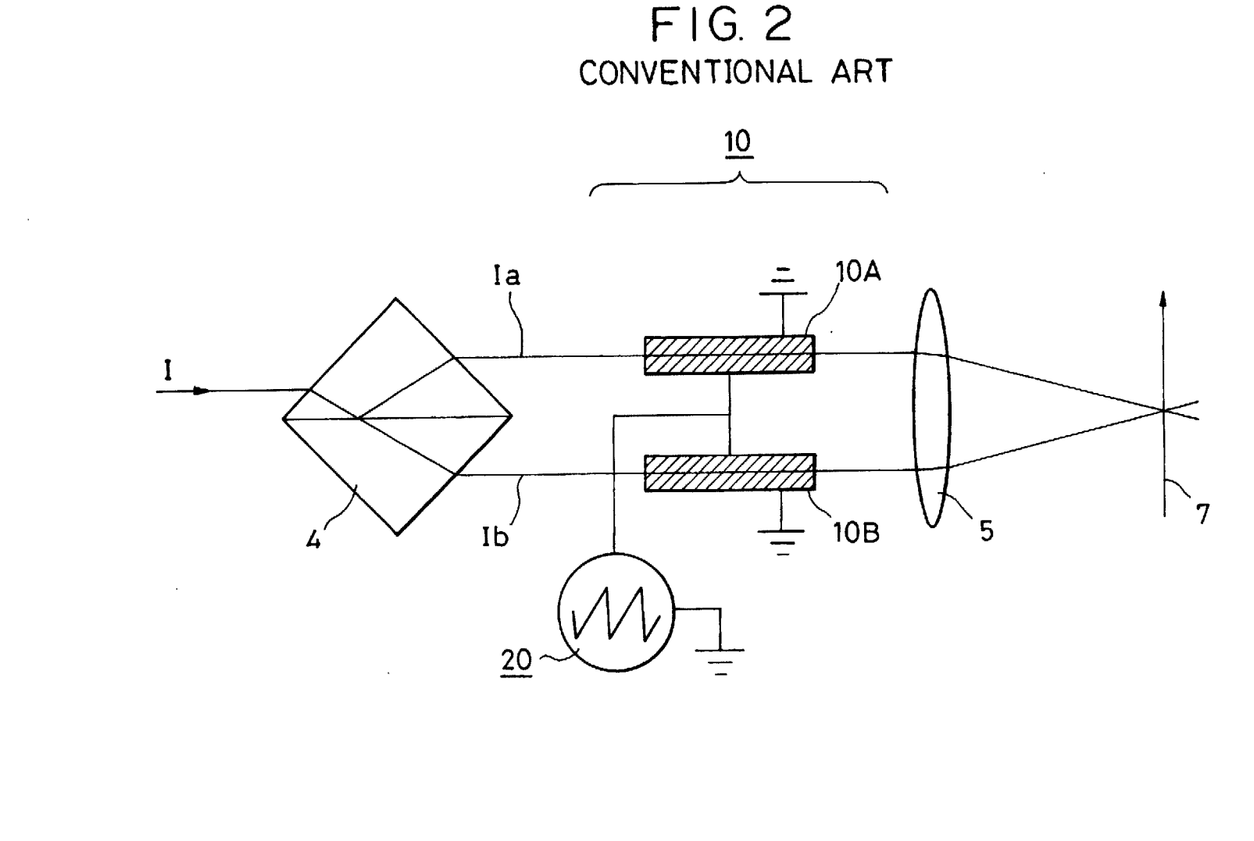
FIG. 2 illustrates another conventional laser Doppler velocimeter.

Foord et al. have disclosed a frequency shifter as shown in FIG. 2 (refer to Appl. Phys., Vol. 7, pp L36–L39 1974). The frequency shifter has an electrooptical element 10 which has electrodes provided on electrooptical crystal plates; a sawtooth voltage is applied to the electrooptical element 10 through a serrodyne driver circuit 20.

In FIG. 2, the luminous flux I having the wavelength λ is separated into two luminous fluxes Ia and Ib through the beam splitter 4 before they respectively reach electrooptical crystals 10A and 10B constituting the electrooptical element 10. At this time, the electrooptical crystals 10A and 10B are subjected to the frequency shift by the serrodyne driver circuit 20 which applies the sawtooth voltage to give plus and minus half-wavelength phase shifts. The two luminous fluxes, which have been subjected to the frequency shifts, are deflected through the lens 5 to be converged; the two luminous fluxes intersect with each other on the moving body 7. The scattered light from the moving body 7 is led into an optical sensor, which is not shown, to produce a Doppler signal.

The Doppler frequency is given by the expression shown below from velocity V of the moving body 7, intersecting angle θ of the two luminous fluxes, and difference in frequency fR between the two luminous fluxes:

$$F = 2 \cdot V \cdot \sin(\theta)/\lambda + fR \tag{4}$$

Thus, the measurement including that of the velocity direction can be performed even when the velocity of the moving body 7 is nearly zero. This configuration is used primarily for an apparatus for measuring flow velocity.

When the electrooptical element is serrodyne-driven as stated above, the amplitude of the sawtooth voltage is relatively large and the sawtooth voltage changes steeply when it falls. This may cause a high-frequency noise which prevents proper detection of Doppler frequency F or leads to poor accuracy.

SUMMARY OF THE INVENTION

Accordingly, it is an object of the present invention to provide a frequency shifter and an optical displacement measuring apparatus using the same which are capable of preventing the adverse influences of the aforesaid high-frequency noise and of maintaining highly accurate measurement. Other objects of the present invention will be made apparent as the description of embodiments progresses.

According to a first aspect of the present invention, a frequency shifter for modulating the phase of luminous flux includes an electooptical element for receiving the luminous flux, a plurality of electrode components provided on the electrooptical elements, a circuit for generating a voltage to be applied to the electrooptical element via the plurality of electrode components, and a shield for electrically shielding the circuit generating the voltage and the electooptical element. The level of the voltage to be applied is variable in order to shift and frequency of the luminous flux received by the electrooptical element, and thereby modulate the phase of the luminous flux.

According to another aspect of the present invention, an optical displacement measuring apparatus for measuring displacement of an object includes a luminous flux generator for generating a measuring luminous flux, a frequency shifter for modulating a phase of the luminous flux, and a light receiving section for receiving light from the object, the object having been subjected to the measuring luminous flux, and the phase of the flux having been modulated by the frequency shifter, and thereby the displacement of the object may be measured by the light received through the light receiving section. The frequency shifter includes the features of the first aspect of the present invention described above.

DESCRIPTION OF THE PREFERRED EMBODIMENTS

Figure 3:
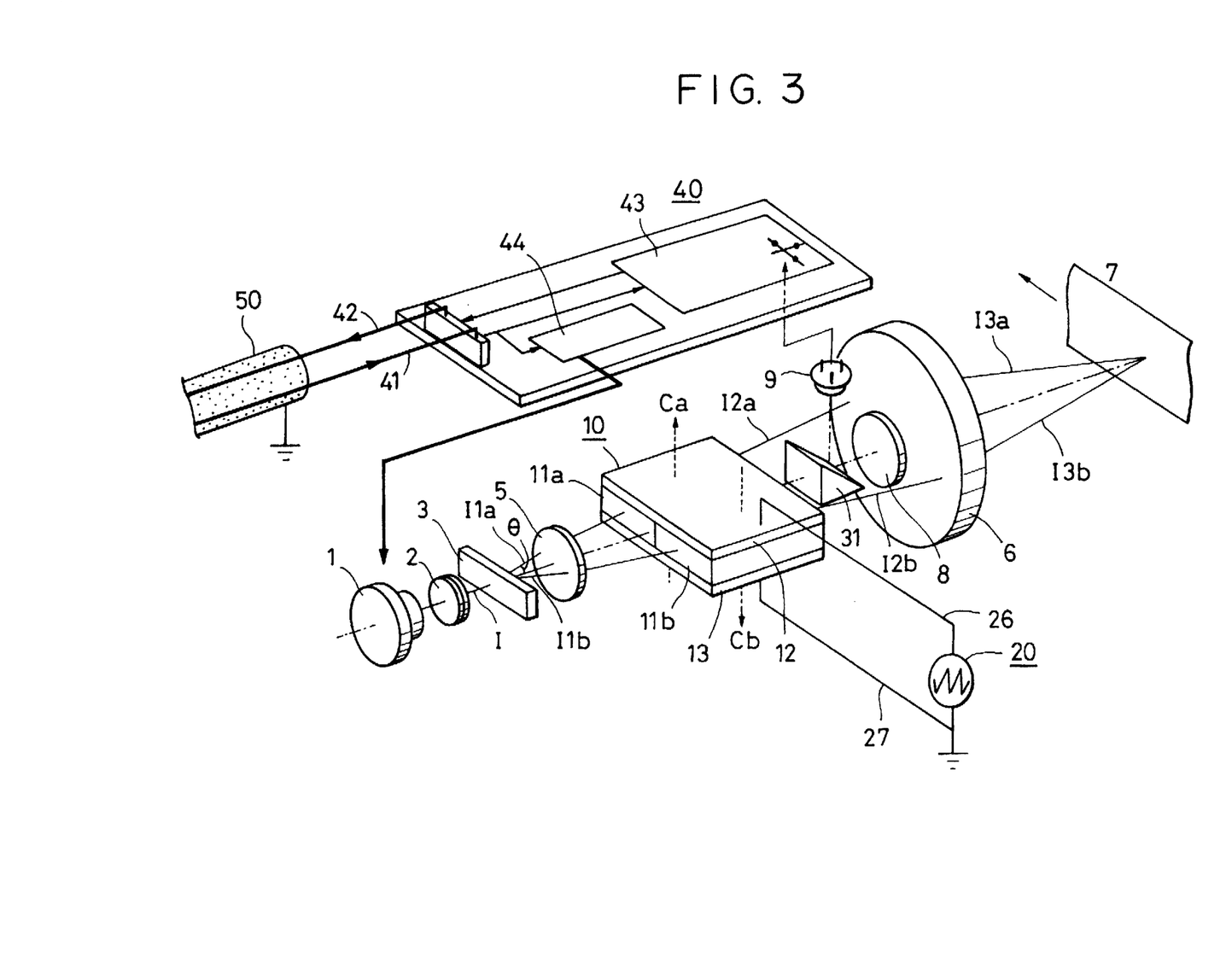
FIG. 3 illustrates a laser Doppler velocimeter of a first embodiment in accordance with the present invention.

FIG. 3 illustrates the configuration of the laser Doppler velocimeter of the first embodiment in accordance with the present invention. The laser Doppler velocimeter for measuring the displacement of object 1 in the drawing includes a laser diode 1, the collimator lens 2, the beam splitter 3 having a diffraction grating, the convex lenses 5 and 6, the condensing lens 8, the optical sensor 9, the frequency shifter 10, electrooptical elements 11a and 11b, electrodes 12 and 13, a serrodyne driver circuit 20, and an electric board 40.

In FIG. 3, the laser beam emitted from the laser 1 is transformed into the parallel luminous flux I through the collimator lens 2. Parallel luminous flux I then enters the diffraction grating 3 and is separated into diffracted lights I1a and I1b of plus/minus primary diffraction angle θ for emission. The luminous fluxes I1a and I1b are then converted into converged beams I2a and I2b through the convex lens 5 having a focal distance f. The electrooptical crystal lens 10, which includes the electrooptical crystal elements 11a and 11b, is located so as to permit the two luminous fluxes I2a and I2b through their corresponding electrooptical crystal elements 11a and 11b.

The electrooptical crystal elements 11a and 11b use uniaxial crystals such as $LiNbO_3$ and $LiTaO_3$ crystals, the electrodes thereof being arranged in the direction of a $C_a$ axis so that the polarization directions of the laser beams coincide with the direction of the $C_a$ axis. This arrangement causes the angle of diffraction θ of the diffraction grating 3 to change as the laser wavelength changes; therefore, the optical paths of the beams in the electrooptical crystals change. But, the polarization directions can be maintained in the direction of the C axis. Hence, the frequency shifter is compatible with the compensating effect which enables the Doppler frequency to be independent from the change in the laser wavelength, which has been described in relation to FIG. 1.

Taking the $LiNbO_3$ crystal as an example, a description will be given in conjunction with FIG. 4. A refractive index ellipsoid of the $LiNbO_3$ crystal under electric field E (Ex, Ey, Ez) can be expressed as follows:

$$(1/no^2 + r22Ey + r13Ez)X^2 + \\ (1/no^2 + r22Ey + r13Ez)Y^2 + \\ (1/ne^2 + r33Ez)Z^2 - 2r22ExXY + \\ 2r51EyYX + 2r51ExZX = 1 \quad (5)$$

Where r denotes the Pockels constant ($r13=10\times10^{-9}$, $r22=6.8\times10^{-9}$, $r33=32.2\times10^{-9}$, $r51=32.0\times10^{-9}$); no denotes the refractive index of an ordinary ray (no=2.286); and ne denotes the refractive index of an extraordinary ray (ne= 2.2).

Figure 4:
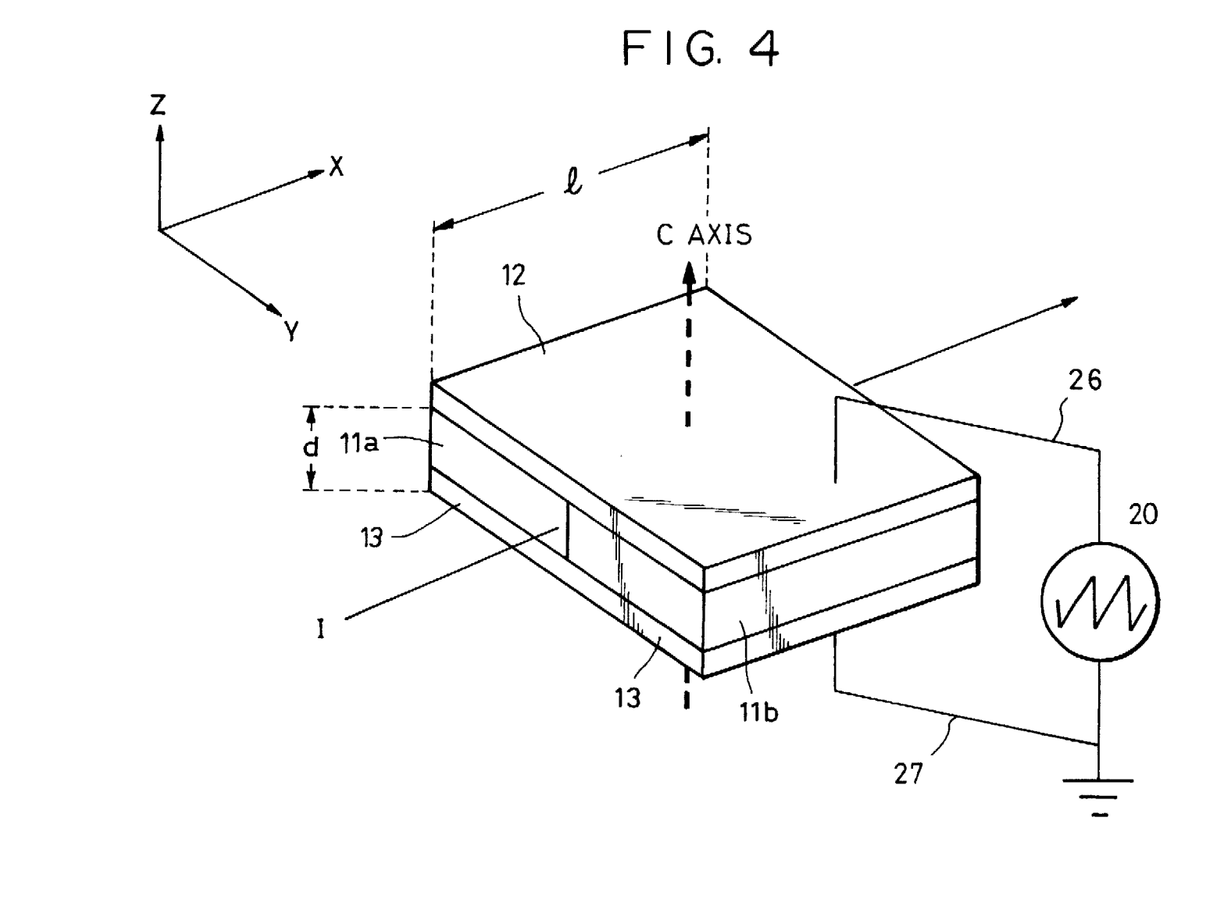
FIG. 4 illustrates an optical frequency shifter employing an electrooptical element.

As shown in FIG. 4, the $LiNbO_3$ crystal is cut in the direction of the Z axis or $C_a$ axis to a thickness of d and electrodes are evaporated on both surfaces of an electrooptical crystal elements 11a and 11b. If an electric field of Ez=V/d supplied from serrodyne driver circuit 20 is applied to the electrooptical crystal elements 11a and 11b through leads 26 and 27 to electrodes 12 and 13 (Ez≠0, Ex=Ey=0), then expression (5) will be:

$$(1/no^2+r13Ez)(X^2+Y^2)+(1/ne^2+r33Ez)Z^2=1 \quad (6)$$

Because $no^2r13Ez$ and $ne^2r33Ez \ll 1$, expression (6) can be simplified as:

$$\frac{X^2+Y^2}{no^2(1-no^2r13Ez/2)} + \frac{Z^2}{ne^2(1-ne^2/2+r33Ez)} = 1 \quad (7)$$

Thus, refractive indexes nx and ny of the polarized components in the directions of the X and Y axes, respectively, are given by:

$$nx=ny=no-\tfrac{1}{2}no^3 r13Ez$$

Refractive index nz of the polarized component in the direction of the Z axis is given by:

$$nz = ne - \frac{1}{2} ne^3 r33 Ez.$$

If the X-Y plane is selected as the propagating direction of light and the direction of the z axis is selected for the polarizing direction, then the application of electric field Ez applied in the direction of the Z axis gives refractive index N (Ez) shown below:

$$N(Ez) = nz = ne - \frac{1}{2} ne^3 r33 Ez \quad (8)$$

Accordingly, when a laser beam is let pass through the LiNbO$_3$ crystal elements 11a and 11b which have the thickness of d and a length of l, if applied voltage V is changed, then optical phase difference Γ(V) is given by:

$$\Gamma(V) = (2\pi/\lambda)\{n(V/d) - N(0)\} \times l = \frac{\pi n e^2 r33 l \cdot V}{\lambda d} \quad (9)$$

Thus, changing the applied voltage at a fixed level changes the optical phase at a fixed level, providing a frequency shifter. In practice, however, it is impossible to change the voltage at the fixed level at all times; therefore, the sawtooth (serrodyne) drive is performed. The sawtooth voltage is set for an amplitude at which the phase difference between the two luminous fluxes is equivalent to $2\pi$ so that the optical phase does not become discontinuous at the fall.

Assuming that thickness d and length l of the LiNbO$_3$ crystal elements 11a and 11b are 1 mm and 2 mm, respectively, the voltage amplitude at which optical phase difference Γ(V) is $2\pi$ is approximately 230 V from expression (8).

In FIG. 3, Ca and Cb of the C axis of the electrooptical crystal elements 11a and 11b, respectively, are arranged in opposite directions from each other along the Z axis; the voltage is applied to them in the same direction through the electrodes 12 and 13 via conductors 26 and 27 from the serrodyne driver circuit 20. This makes it possible to achieve the $2\pi$ optical phase difference between the luminous fluxes 12a and 12b after passing through the electrooptical element 10 at half of the voltage amplitude corresponding to $2\pi$, i.e. the voltage amplitude for giving the $\pi$ phase difference. In this case, the required voltage amplitude is approximately 115 V.

Referring back to FIG. 3, the luminous fluxes 12a and 12b, which have been modulated to have opposite phases from each other by the electrooptical element 10, are turned into the parallel luminous fluxes 13a and 13b through the convex lens 6 and they are radiated to the object 7, the displacement of which is to be measured and which is moving at velocity V, at incident angle θ which is equivalent to the angle of diffraction θ given by the diffraction grating 3. The scattered light from the object 7 to be measured is condensed to the optical sensor 9 of the electric board 40 via the condensing lens 8 and a mirror 31. The scattered light of the parallel luminous fluxes 13a and 13b has been frequency-modulated by the frequency shifter composed of the electrooptical element 10 and the serrodyne driver circuit 20; frequency F is given by the following expression:

$$F = 2 \cdot V \cdot \sin \theta / \lambda + fR = 2 \cdot V/d + fR \quad (10)$$

The electric board 40, on which the optical sensor 9 is mounted, is provided with a power line 41 for receiving the power supplied from outside, a signal line 42 for sending signals to outside, an amplifier circuit 43 for amplifying the outputs of the optical sensor, and a laser driver circuit 44 for controlling the output of the laser diode 1 at a fixed level. The lines 41 and 42 are covered with a grounded knitted shield 50.

A detected signal supplied by the optical sensor 9 is amplified through the amplifier circuit 43 and transmitted to an external signal processor (not shown) through the signal line 42. The external signal processor calculates moving velocity V of the object 7 to be measured from frequency F according to expression (10). The signal processing is known and the description thereof will be omitted.

Figure 5A:
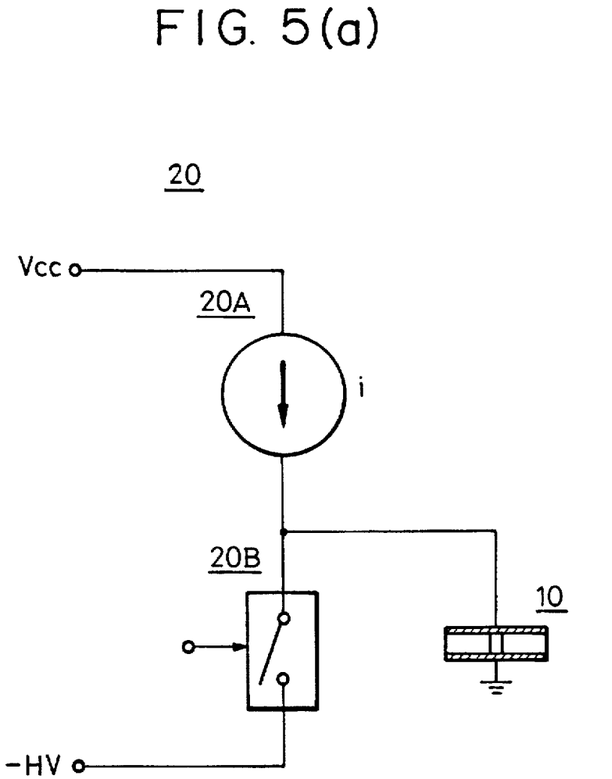
FIG. 5(a) is a block diagram showing an example of a serrodyne (sawtooth) driver circuit.

FIG. 5(a) is a typical block diagram of the serrodyne driver circuit 20 for applying the sawtooth voltage to the electrooptical element 10. The serrodyne driver circuit 20 is constituted by a constant-current circuit 20A and a discharger circuit 20B; the constant-current circuit 20A supplies constant current i to the electrodes of the frequency shifter 10, which is considered to have a fixed capacity, so as to charge it.

Figure 5B:
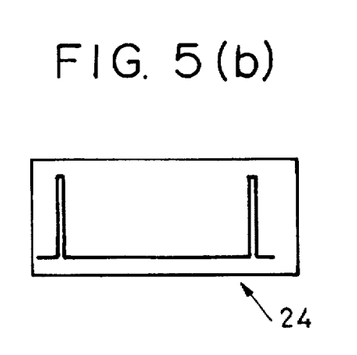
FIG. 5(b) illustrates a waveform 24 of a pulse used to operate discharger circuit 20B.
Figure 5C:
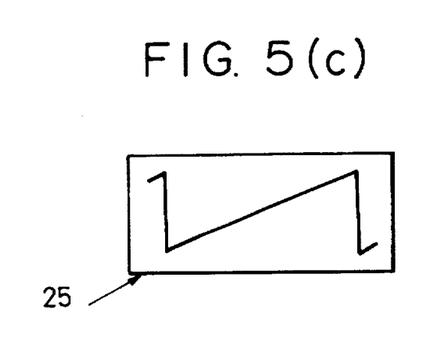
FIG. 5(c) illustrates a sawtooth waveform 25 produced by serrodyne driver circuit 20.

The discharger circuit 20B momentarily turns ON a switch by using an extremely short pulse 24 shown in FIG. 5(b) of a fixed period to discharge instantly the electrooptical element 10 which has been charged by the constant-current circuit 20A. Thus, the serrodyne drive of a fixed cycle illustrated by sawtooth waveform 25, shown in FIG. 5(c), is achieved by repeating the charging and the instant discharging.

Figure 6:
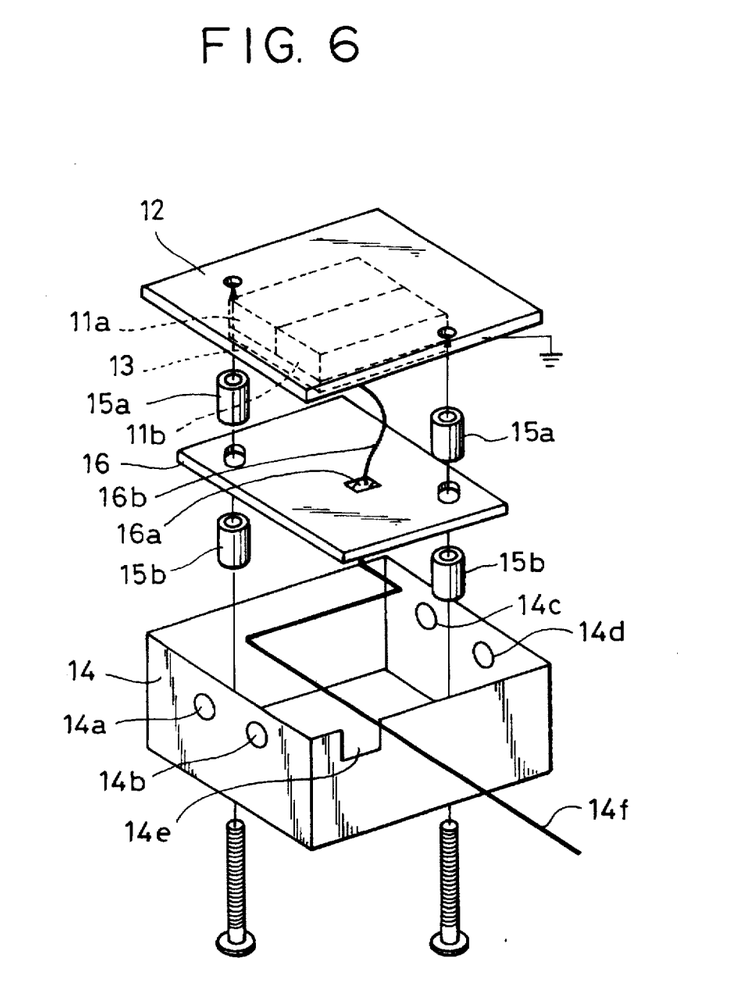
FIG. 6 illustrates the electrooptical element in detail.

FIG. 6 shows the specific configuration of the electrooptical element in this embodiment.

A circuit board 16 on which the serrodyne driver circuit 20 may be surface-mounted, is arranged using spacers 15a and 15b so that it faces the serrodyne driver electrode 12 of the electrooptical element 10. The sawtooth voltage is supplied to the electrode 13 via a short lead wire 16b from a pad 16a provided on a serrodyne driver circuit board 16.

The electrooptical element 10 and the serrodyne driver circuit board 16 are shielded by the grounded electrode 12 of the electrooptical element 10 and a cover 14 which is made of a conductive material and which is provided with apertures 14a through 14d for luminous fluxes and an aperture 14e for a power cable (not shown) and a cable 14f for a clock 23 shown in FIG. 7(a) which will be discussed later.

Figures 7A, 7B:
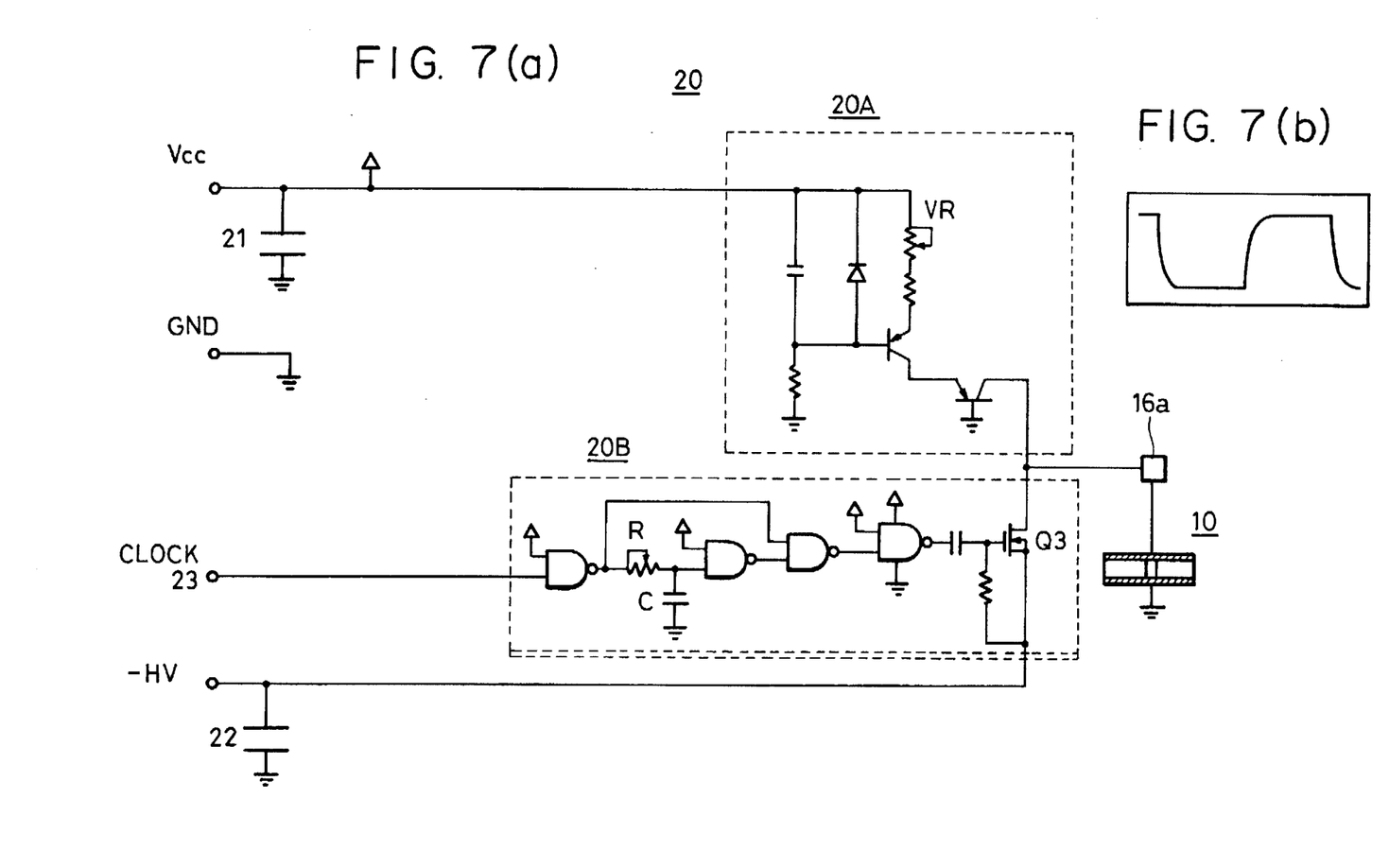
FIG. 7(a) illustrates the serrodyne driver circuit of the frequency shifter.
FIG. 7(b) illustrates a waveform of the clock signal of input clock 23.

FIG. 7(a) is the circuit diagram of the serrodyne driver circuit employed for the embodiment. The constant-current circuit 20A using a well-known arrangement of circuit elements, supplies constant current i, which has been regulated by a variable resistor VR, through the pad 16a to the electrooptical element 10 which is considered to have a fixed capacity. The discharging circuit 20B produces the extremely short pulse 24, shown in FIG. 5(b), by utilizing the delaying function of an RC circuit composed of a resistor R and a capacitor C at the fall of the clock signal received from the clock 23 of a transmitter or the like. The pulse is used to momentarily turn ON a switching transistor Q3 so as to instantly discharge the electrooptical element 10, which has been charged by the constant-current circuit 20A, nearly to the source voltage, −HV, of the switching transistor Q3. Thus, the serrodyne drive at the clock signal period of the input clock 23, whose waveform is shown in FIG. 7(b), is carried out by repeating the charging and the instant discharging.

Capacitors 21 and 22 serve to prevent high-frequency noises from leaking to power supplies Vcc and −HV, respectively, from the serrodyne driver circuit. The clock 23 is designed to smooth the waveforms through an appropriate high-frequency filter, not shown, but known in the art, to minimize higher harmonics before outputting them.

In the aforesaid circuit, 2SA1226 made by NEC, 2SA1384 made by HITACHI, and 2SK1334 made by HITACHI are respectively used for the transistors Q1, Q2, and Q3. Small surface-mounted elements such as TC74AC00F made by TOSHIBA are used for ICa through ICd. The electrooptical element 10 and the serrodyne driver circuit board 16 are piled-up and shielded by the cover 14 or the like shown in FIG. 6 to make the frequency shifter. Incorporating the frequency shifter in the optical system shown in FIG. 3 has provided a noise-free Doppler signal.

An example for comparison will now be described with reference to FIGS. 8(a) and 8(b).

Figure 8A:
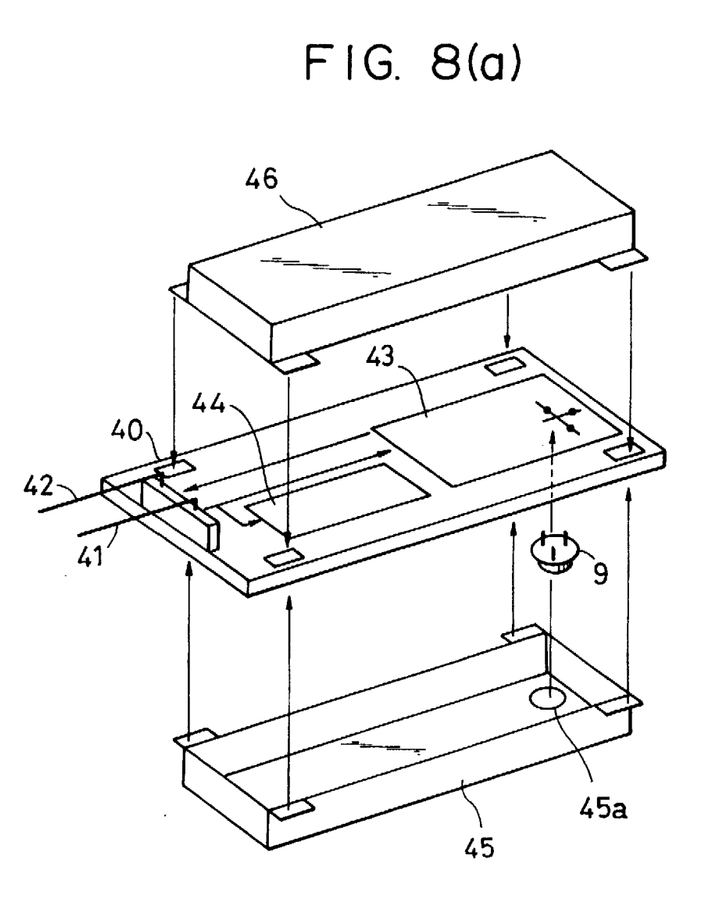
FIG. 8(a) and 8(b) illustrate comparative examples.

In FIG. 8(a), instead of using the case shown in FIG. 6, only the electric board 40 was shielded by conductive covers 45 and 46. Cover 45 has an aperture 45a for receiving the light from the optical sensor 9. This arrangement failed to prevent high-frequency noise. The high-frequency noise could not be prevented perfectly also when the electrode 12 was grounded and the sawtooth waveform voltage was applied to the electrode 13.

Figure 8B:
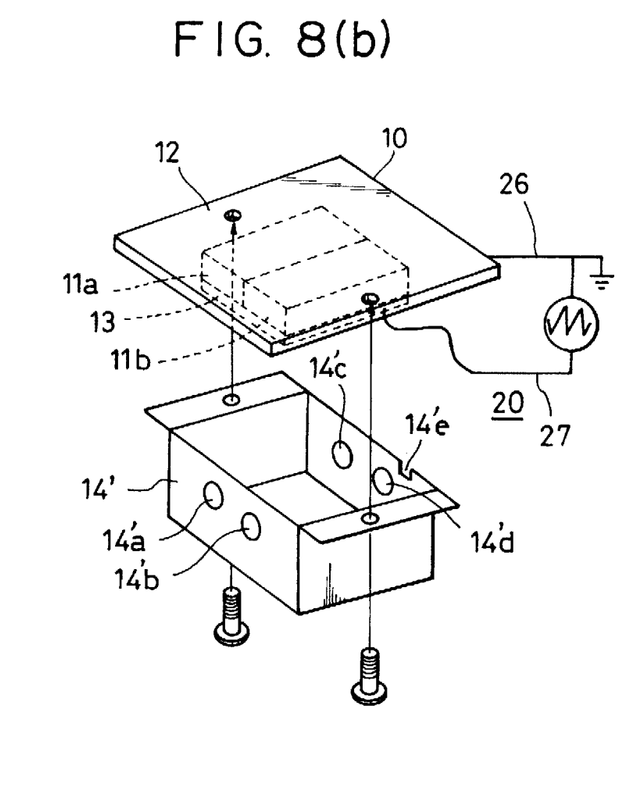

In the device shown in FIG. 8(b), instead of using the case shown in FIG. 6, the cover shown in (a) was used and only the electrooptical element 10 was shielded by a conductive cover 14', which has apertures 14'a through 14'd for the luminous fluxes 12a and 12b as shown in (b), and aperture 14'e for a power cable and a cable to the clock (neither cable being shown). This arrangement also failed to completely prevent high-frequency noise. The noise was particularly conspicuous as cables 26 and 27 from the serrodyne driver circuit 20 came closer to cables 41 and 42 of the electric board 40.

The failure to prevent the high-frequency noise is considered due to the fact that, although the cables 41 and 42 of the electric board 40 are shielded by the knitted shield 50 outside the apparatus, the portions thereof for the connection to the electric board are not completely shielded against the serrodyne driver circuit inside the apparatus, and therefore they pick up high-frequency noises from the serrodyne driver circuit.

Figure 9:
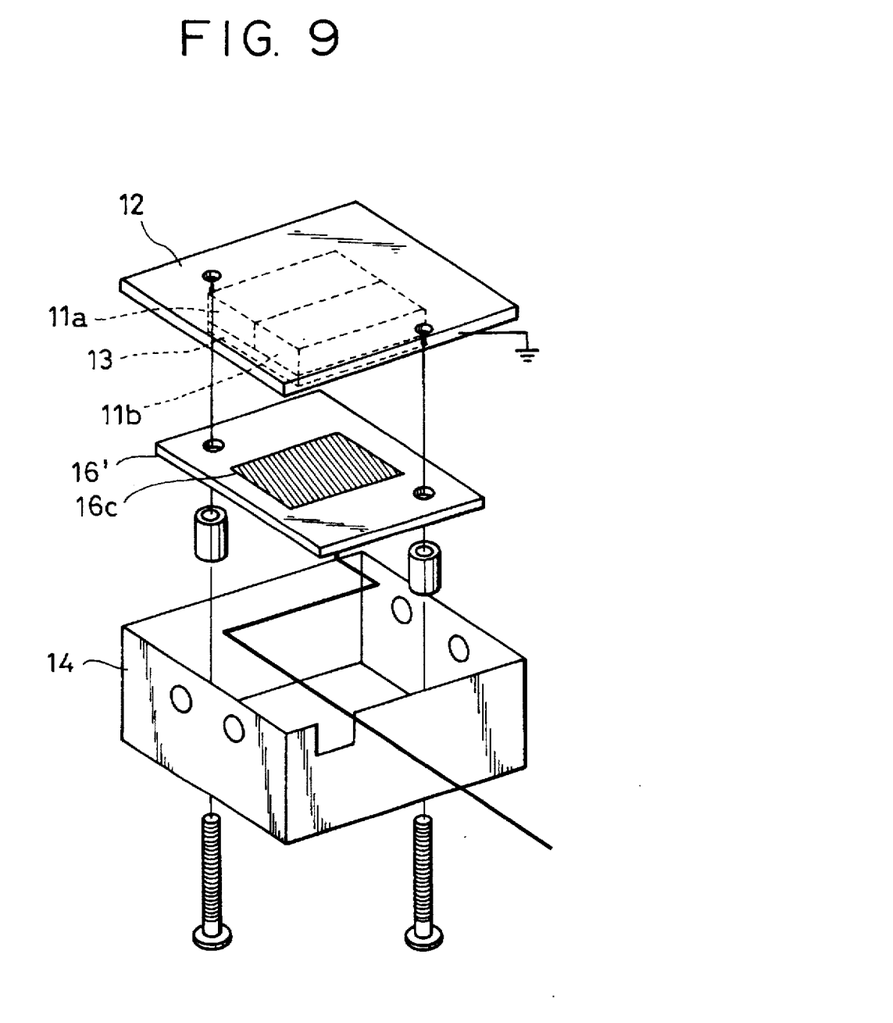
FIG. 9 illustrates a part of a laser Doppler velocimeter of a second embodiment in accordance with the present invention.

FIG. 9 illustrates a part of another embodiment in accordance with the present invention. FIG. 9 shows only the electrooptical element as shown in FIG. 6. The rest of the configuration is identical to the first embodiment; therefore, the description and drawings will be omitted.

In the second embodiment, a serrodyne driver circuit board 16' has surface-mounted elements of the serrodyne driver circuit on one surface thereof and has an electrode 16c for supplying the sawtooth voltage on the other surface. The electrode 16c has been gold-plated approximately to the size of the electrode 13 of the electrooptical element 10; it is screwed directly to the electrode 13 of the electrooptical element 10 to supply the sawtooth voltage. Thus, providing the circuit board with the plated electrode for the contact with the electrode 13 makes it possible to achieve compact design in the case and consequently a smaller apparatus incorporating it.

The electrooptical element 10 and the serrodyne driver circuit board 16 are shielded with a conductive cover 14, which has apertures for luminous fluxes and an aperture for the cable for the power and the clock 23, and the grounded electrode 12 of the electrooptical element 10 as described above.

In the above embodiments, the electric noise from the frequency shifter, which employs the electrooptical element, can be controlled by a shielding space formed by the case and the electrode. Further, an electric power supply cable to the frequency shifter and another cable of the apparatus can be combined into one and the frequency shifter can be incorporated in the apparatus in a compact manner.

The individual components shown in outline or designated by block in the drawings are all well-known in the art and their specific construction and operation are not critical to the operation of best mode for carrying out the invention.

While the present invention has been described with respect to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A frequency shifter for modulating a phase of luminous flux, comprising:

an electrooptical element for receiving the luminous flux;

a plurality of electrode components provided on said electrooptical element;

a voltage generating circuit for generating a voltage to be applied to said electrooptical element via said plurality of electrode components, a level of the voltage being variable in order to shift a frequency of the luminous flux received by said electrooptical element, thereby modulating the phase of the luminous flux; and a shield for shielding both said voltage generating circuit and said electrooptical element.

2. A frequency shifter according to claim 1, wherein a part of said shield serves also as one of said plurality of electrode components.

3. A frequency shifter according to claim 2, said part of said shield serving as one of said plurality of electrode components supports said electrooptical element.

4. A frequency shifter according to claim 1, wherein said voltage generating circuit is provided on a circuit board, a surface of the circuit board facing one of said plurality of electrode components, said voltage generating circuit applying the voltage to said electrooptical element through the surface facing one of said plurality of electrode components.

5. A frequency shifter according to claim 1, wherein said voltage generating circuit applies a sawtooth voltage to said electrooptical element.

6. A frequency shifter according to claim 1, wherein said shield is made of a conductive material, said shield having a section for holding said voltage generating circuit and said electrooptical element.

7. A frequency shifter according to claim 6, wherein said shield has at least one first aperture to allow incoming luminous flux to pass through and at least one second aperture to allow outgoing luminous flux to pass through.

8. A frequency shifter according to claim 1, wherein said electrooptical element comprises a uniaxial crystal, and said plurality of electrode components are arranged to hold said uniaxial crystal from both sides of the C axis of said uniaxial crystal.

9. An optical displacement measuring apparatus for measuring the displacement of an object, comprising:

a luminous flux generator for generating a measuring luminous flux;

a frequency shifter for modulating the phase of the measuring luminous flux, said frequency shifter comprising:

I) an electrooptical element for receiving the measuring luminous flux;

II) a plurality of electrode components provided on said electrooptical element;

III) a voltage generating circuit for generating a voltage to be applied to said electrooptical element via said plurality of electrode components, a level of the voltage being variable in order to shift a frequency of the luminous flux received by said electrooptical element, thereby modulating the phase of the luminous flux; and IV) a shield for shielding both said voltage generating circuit and said electrooptical element; and a light receiving section for receiving light from the object, the object having been subjected to the measuring luminous flux, the phase of the flux having been modulated by said frequency shifter, the displacement of the object being measured by the light received through the light receiving section.

10. An optical displacement measuring apparatus for measuring the displacement of an object according to claim 9, further comprising an optical system for leading said measuring luminous flux to the object to be measured, said frequency shifter being located in an optical path of said optical system.

11. An optical displacement measuring apparatus for measuring the displacement of an object according to claim 10, wherein said shield has at least one first aperture to allow incoming luminous flux to pass through, and at least one second aperture to allow outgoing luminous flux to pass through.

* * * * *